(No Model.) 3 Sheets—Sheet 1.
H. A. KING.
VELOCIPEDE.
No. 341,383. Patented May 4, 1886.
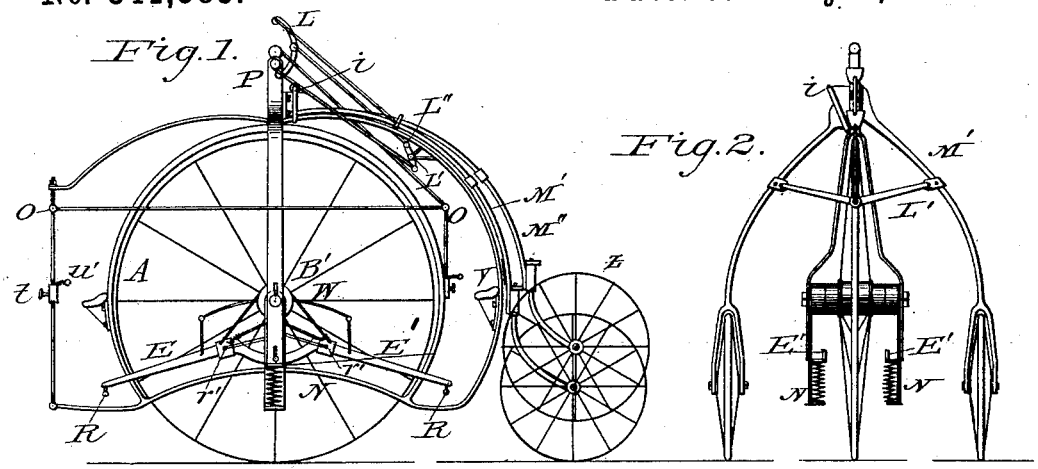
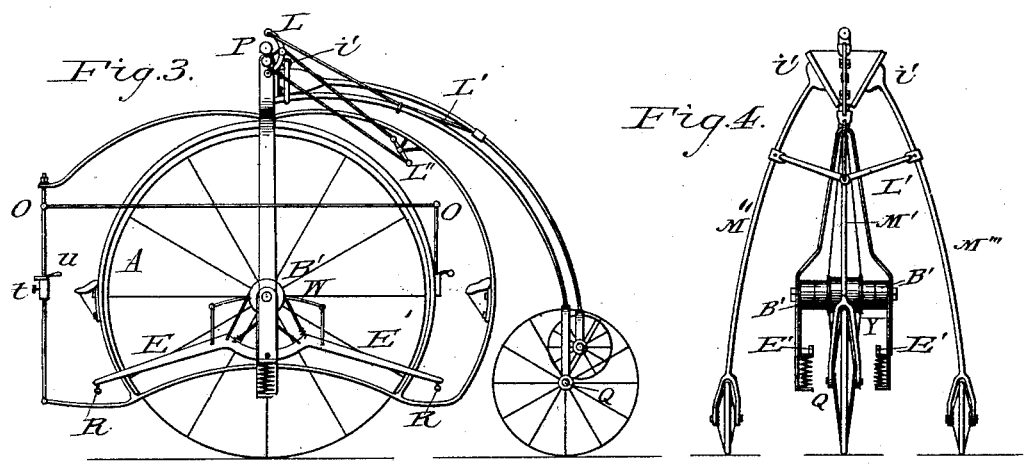
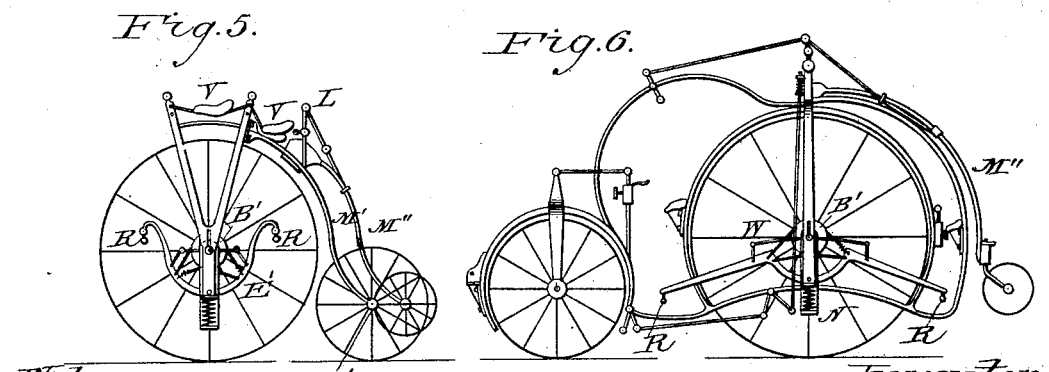
Witnesses:
A. M. Long
F. C. Doty
Inventor:
Homer A. King (No Model.) 3 Sheets—Sheet 2.
H. A. KING.
VELOCIPEDE.
No. 341,383. Patented May 4, 1886.
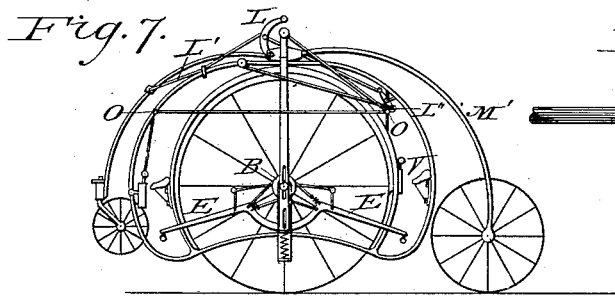
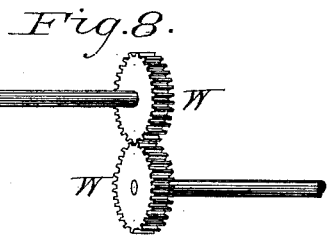
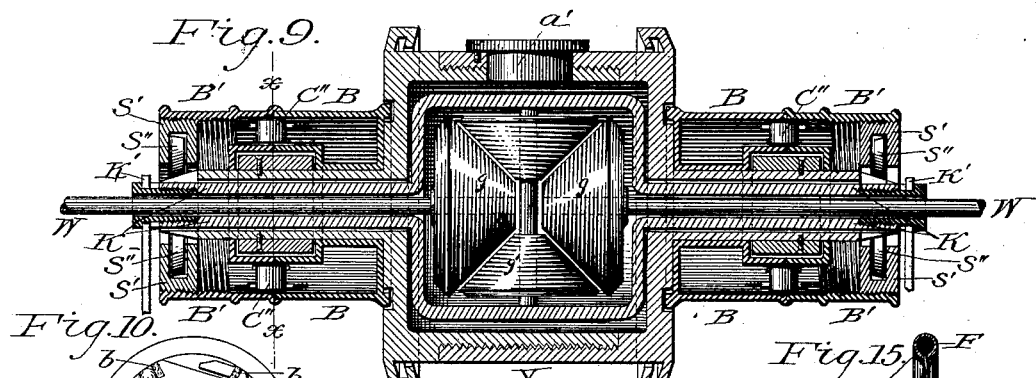
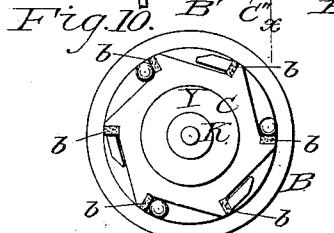
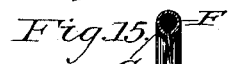
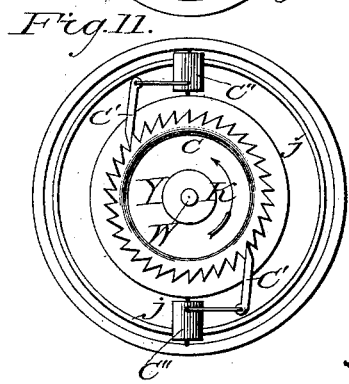
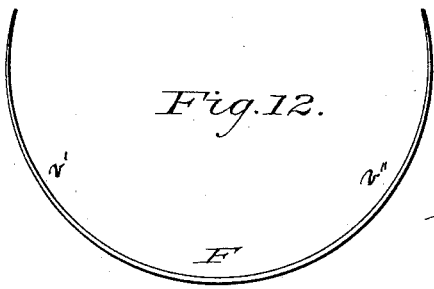
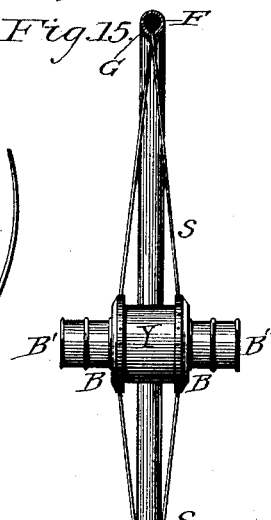
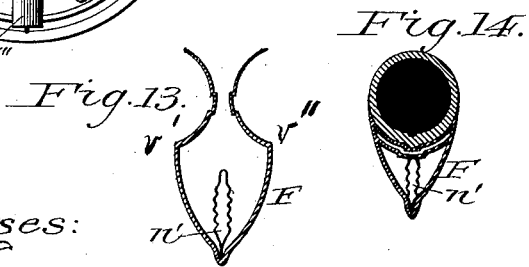
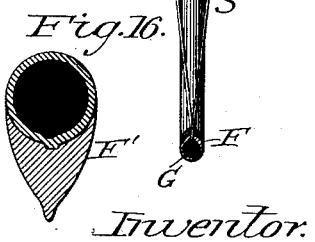
Witnesses:
A. M. Long
Frank E. Doty
Inventor.
Homer A. King.

(No Model.) 3 Sheets—Sheet 3.
H. A. KING.
VELOCIPEDE.
No. 341,383. Patented May 4, 1886.
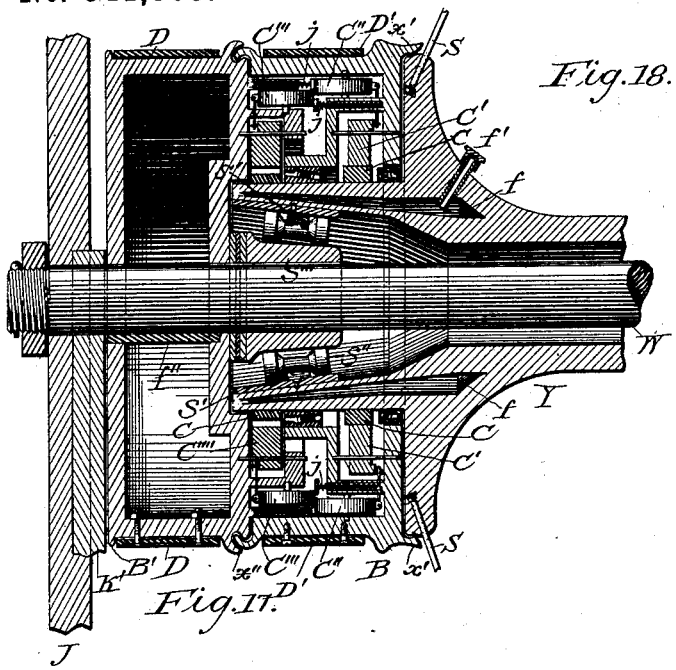
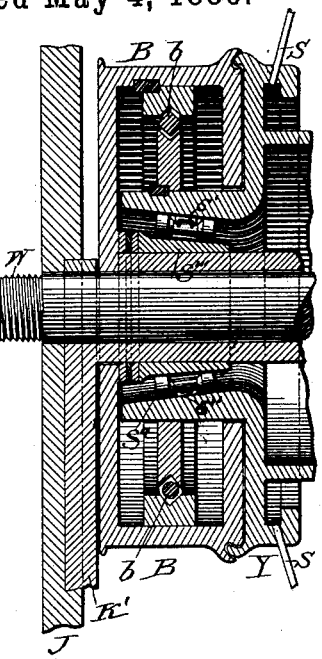
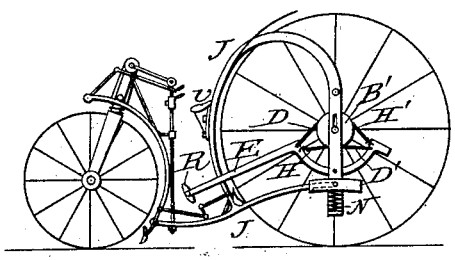
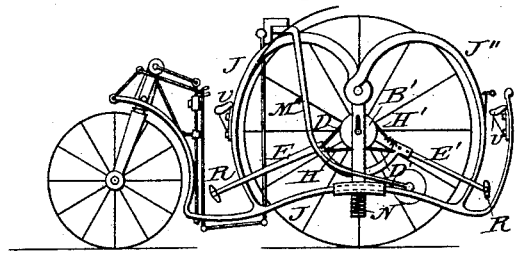
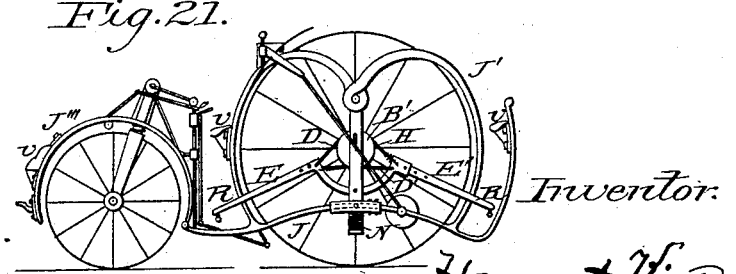
Witnesses:
Mary E. King.
Anna S. Alger.
Inventor:
Homer A. King.
N. PETERS, Photo-Lithographer, Washington, D. C.

UNITED STATES PATENT OFFICE.

HOMER A. KING, OF SPRINGFIELD, MASSACHUSETTS.

VELOCIPEDE.

SPECIFICATION forming part of Letters Patent No. 341,383, dated May 4, 1886.

Application filed October 6, 1885. Serial No. 179,135. (No model.)

*To all whom it may concern:*

Be it known that I, HOMER A. KING, a citizen of the United States, residing at Springfield, in the county of Hampden and State of Massachusetts, have invented new and useful Improvements in Motor Carriages, which improvements are fully set forth in the following specification and accompanying drawings.

My improvements embraced in this specification are here described in connection with improvements described in my application filed September 4, 1884, Patent No. 327,397, issued September 29, 1885, and my application filed August 6, 1885, Patent No. 327,954, issued October 6, 1885, but may be used with other styles of bicycles, tricycles, and quadricycles.

The present invention relates more particularly to the use of one or more extra backbones for a vehicle, first, by constructing one of the two backbones of a tricycle adjustable and removable, so that the rider can speedily change it to a one-track bicycle by drawing a lever, thus swinging the adjustable perch or backbone with its trailing wheel up from the ground upon a rest, which can be done, or the reverse, while the vehicle is in motion; or the tricycle can be changed to a bicycle by removing the auxiliary backbone with its trailing wheel; secondly, by using two very light adjustable and removable auxiliary backbones attached to the main backbone or to the frame of the vehicle, and so arranged that they can be swung up to a place of rest with their following wheels, even while the vehicle is in motion, and the vehicle thus be changed to a bicycle, and they may be swung down again into position while the vehicle is in motion and the bicycle thus changed to a quadricycle; or the auxiliary backbones may easily be removed.

This invention also relates to an improvement in the construction of the slide-block to increase the speed at the expense of power, or vice versa, adapting it to my double lever; to another arrangement for the two seats; to another style of vehicle without the rear backbone, the small wheel being in front; to an improvement in the construction of the connection between the levers on either side of the driving-wheel by connecting through the hub or axle; to an improvement in the silent clutch of my application of September 4, 1884, by attaching cloth, rubber, or some other yielding substance for the pawl-balls or pawl-wedges to fall back upon to render their action more noiseless; to an improvement in the pawl-and-ratchet arrangement, dispensing with the clicking sound, and also with the pawl feature, providing a silent ratchet operated by the rotating of the double pulley-boxes or two drums in opposite directions, and enabling the vehicle to be run backward; to an improved construction of a hollow and also of a solid metallic felly; to an improved form of rubber tire and to an improved hub; to my inclined adjustable spool-bearings.

Referring to the drawings, similar letters of reference indicate corresponding parts.

Figure 1 is a side elevation view of a tricycle changed to a bicycle by adjusting the auxiliary backbone M″ with its trailing wheel resting on a projection from the fork or frame of the following wheel of the backbone M′, both the following wheels with their forks pivoted to the lower ends of the backbones, so as to trail as casters. This is especially necessary in the backbone M′, as it occupies a different relation to the driving-wheel when the vehicle is used as a tricycle with backbone M″ from what it does when used as a bicycle. A removable non-adjustable double backbone could be used for the tricycle and be removed for a single backbone to change to a bicycle; but the adjustable feature would be sacrificed. Fig. 1 also shows the handle L″ with connection to adjusting-lever L, which does not appear in the former applications. On the levers E and E′ are shown two slide-blocks, r′, with adjusting-braces between and connection over a pulley below to an eccentric by the rider, whereby by moving the adjusting-handle of the eccentric up or down the power is increased and speed lessened or the speed increased at an expense of power. The levers E and E′ on one side are also connected by the connection W to the levers on the other side of the driving-wheel, so that the depression of the lever by one foot on the treadle R raises the foot on the other side of the driving-wheel, thus saving much fatigue.

Fig. 2 is a rear view of the vehicle shown in Fig. 1 when both wheels are on the ground as a tricycle. It also shows the oblique position of the pivot $i$, which causes the backbone M'' to swing down when swung to the left and up when swung to the right, as shown. The adjusting-stays L' are also shown connected to lever L, their combined length being nearly equal to the distance between the tracks made by the two following wheels.

Fig. 3 is a side elevation view of a quadricycle changed to a one-track bicycle by having the two auxiliary backbones or perches with their following wheels adjusted on the rest Q. This construction may be preferred to Figs. 1 and 2, because the auxiliary perches or backbones can be made very light and adjusted by a lever to rest with their trailing wheels very near the ground for safety, and none of the wheels need be trailing wheels as casters, like in Figs. 1 and 2, but only as they trail with the backbones, as the small wheels of the auxiliary backbones M'' and M''' can be constructed at such an angle from the line of the backbones M'' and M''' that they will run making a track parallel with the track of the following wheel of the backbone M' when all are running on the ground. In Fig. 1 there is only one auxiliary backbone, but in Figs. 3, 5, 6, and 7 it is understood that there are two, although only one is shown in the side elevation view, the same as it is understood that corresponding ends of the bent handle-bars $u'$ exist, and duplicate propelling-straps and a corresponding double lever, E and E', are on the farther side of each driving-wheel, though only one is shown in the side elevation view, but the rear view in the next figure shows both.

Fig. 4 is a rear view of the quadricycle shown in Fig. 3, when all the wheels are on the ground. The oblique inclination of the pivots $i\ i$ determines the combined length of the adjustable rods L', as well as the width between the tracks made by the two outer wheels, though the same result may be otherwise accomplished. The movement of the inner ends of the adjustable stays L' by cord to the lever L and handle O, or otherwise, toward the neck of the backbones raises the backbones with their following wheels from the ground to a position of rest, while the movement of the inner ends of the rods L' in the opposite direction swings the two auxiliary backbones and small wheels out and down upon the ground. These light adjustable removable auxiliary perches or backbones may be straight or bowed up or down or in any suitable form with their following wheels, and they will be highly prized by timid riders, and will be a great desideratum in mounting and starting the vehicle, as well as in stopping and dismounting, as the vehicle will stand alone, and yet when once under headway the auxiliary wheels may be swung up to a place of rest by the large wheel, or only a little above the ground, and the one-track bicycle with but little friction may be run in a cow-path.

Fig. 5 is a side elevation view of a quadricycle changed to a single-track two-seated safety-bicycle by the adjustment of its two auxiliary backbones, which are attached to the backbone M', not at its neck, but back of and lower than the seat, which is between the neck and place of attachment. When the auxiliary backbones are removed this is a very light and convenient bicycle, adapted to carry one rider, or a man in the rear seat and a boy in the front seat.

Figs. 6, 19, 20, and 21 are quadricycles with the auxiliary backbones adjusted, changing them to bicycles, and also shows a small front steering-wheel bicycle with the auxiliary adjustable backbones M'' and M''' attached to the frame without a backbone, M'; but the trailing wheels, as in Figs. 1 and 2, are needed when the auxiliary backbones are used. The parts of the frame over the seats may be dispensed with if the lower parts be very strong, and may have only one seat with a set of single levers, as shown in Fig. 19, or other levers, a seat-attachment and seat, or seat-attachments and seats, as shown in Figs. 20 and 21.

Fig. 7 is a view of a quadricycle changed to a bicycle by the adjustment of its two adjustable and removable backbones and trailing wheels on the rest Q', or on one or more hooks of the lever-holders. One of the wheels may work on the same pivot as the rear backbone and the other attached to its neck, as in Figs. 1 and 2, or they may work on a separate pivot or pivots, as in Figs. 3 and 4, and also shows these in front of the fork of the large steering-wheel, where they may be swung down upon the ground or swung up in front, as shown, where they are a safeguard when two persons of nearly equal weight are riding in the two seats down a steep hill, or when the front wheel runs into a hole. The trailing wheels are like those in Fig. 1, only they are made to hang toward the pivot of the backbone M'', as shown, and are also kept in position, being constructed with a projection from the pivot to strike the backbone, and thus to turn only part way around. The backbones of the trailing wheels can be shorter if attached nearer the ground.

Fig. 8 is a view of the connection W, as shown in the drawings of my Patent No. 327,397, the shafts in Fig. 1, drop-axle style, not being in line.

Figs. 9 and 18 show the improved construction of the hub Y, and also the improved connection W, the shaft passing through the hub and axle K, the axle K being a tube, except in its center, where it is of greater diameter, through the sides of which there is an opening to insert the cog-work, the axle of the center cog-wheels, $g'$, having their bearings in the two remaining sides of axle K, and each of the other two cog-wheels, $g$, being rigidly secured to one inner end of the central separated axle or connection-shaft W, the center connection cog-wheels causing one lever to rise on one side of the drive-wheel when the lever on the other side is depressed. It is evident that one of the center cog-wheels, g', on the perpendicular shaft would form the connection between the cog-wheels g on the ends of the central separated axle W; but two are stronger than one, and strength is important, as the connection enables the rider to bear his whole weight alternately on the pedals, thus utilizing his weight as well as his strength in propelling the vehicle. It can be used with the single-lever and single-drum style of bicycle, as shown in Fig. 18, and in drop-axle vehicles; but there must be used either my double drum propelling mechanism or springs to raise the levers. It can also be used between the levers on a tricycle with the single-drum style. The inclined adjustable spool-bearings S' and S'' run between the inclined case-hardened collar-bearing in the end of the hub and the inclined case-hardened flanged bearing-collar S''', and the adjustment is effected by washers between the outer end of the inclined collar S''' and the box B', which are more clearly shown in the enlarged Fig. 17; but instead of the cog-wheel connection of Fig. 9, in this the center of the hub is made small with only one connection shaft or axle, which passes clear through the hub and frame on each side, and holds the frame together by a burr or nuts on one or both of the ends of the shaft or axle, and yet it is left so that it can turn with the drums B' at each end of the hub, as they are by a spline, f''', or otherwise, securely fastened to the axle. The portion of the inclined spool S'' between the two flanges should be proportionally much smaller than shown in the drawings, to give more room for the collar S', and to lessen the friction of the spool S'' turning in the cavities of the rider S'. The outer flange of spools S'' is of greater diameter than the inner flange, which travels a less distance in completing the circle. If preferred, the connection shaft or axle W, Fig. 17, may be hollow, and extend only through the hub and double propelling-drums B and B' to the frame at each end of the hub, and a central non-rotating axle be used, passing through the hollow axle, and also through the frame, and secured by one or more burrs, thus avoiding friction in the frame when the connection-axle W rotates with the drums B'.

Figs. 15 and 17 show only two recesses for straps on each end of the hub—one on each propelling box or drum. These straps should be secured near the top of the drums, each strap being secured near its center, the end passing to the front of the box being lettered either D or D', and the end passing back being lettered H or H'. When there are two recesses on each propelling-drum—one for the propelling-strap and one for the retracing-strap—the straps are secured at one end to the drum.

By my continuous axle-connection through the hub of my bicycle I render the set of double drums—one each side of the wheel—equivalent to the one set in my straight-axle tricycle of Patent No. 327,397, for by attaching one end of the propelling-strap D, Fig. 20, on one side of the vehicle to one of these drums B', and passing the other end over in front and fastening it to the lever E, and the propelling-strap D' from drum B over in front and down and around back to the rear on lever E', and the retracing strap or cord H from drum B back to lever E' and H', over down back of B' and out to lever E', and on the other side of the vehicle, Fig. 21, the propelling-strap D from drum B, over in front to lever E, and the propelling-strap D' from drum B' over and down in front and under back to lever E', and the retracing-strap H' from drum B over to lever E, with retracing-strap H from drum B' back down and out in front to lever E, the depression of one lever on one side of the vehicle by the pressure of the foot on the treadle will raise the lever and the other foot of the rider on the other side of the vehicle, thus saving much fatigue. The set of rotating connection-rollers C'' of the drum B are shown with connection-rods, which connect the rollers C'' with the dogs C', and throw the dogs out of or into connection with collet C, as the drums B and B' rotate, as they always do, in different directions, and the rollers C'', pivoted in drum B, are aided to turn by friction against the spring-adjusted ring j, secured to and rotating with the drum B'. The spring-adjusted ring may be dispensed with, and the axle of the rollers c'' be adjusted by strings in slots, so that the rollers in one drum will be pressed directly against the other drum without the intervention of the ring j; or the adjustment to move the dogs may be made between the rotating axle and the drum rotating in the opposite direction, retaining only enough ratchet mechanism to apply power to only one end of the hub at each depression of a lever. Two other rollers are similarly attached to the drum B', though out of sight in Fig. 11, but shown in Fig. 17.

Figs. 10 and 18 show an improved construction of the pawl-balls and wedges in the clutch mechanism of my application of 1884, leather or some yielding substance being used back of the pawls at b to render their movements noiseless.

Fig. 11 is a cross section view of Fig. 9, showing one set of the connection-rollers C'' full and round with one of the two sets of dogs C', which bite the ratchets in collet C, and stop the rolling of rollers C'' when the drum B rotates forward. Another set of dogs and rollers with B' take hold of the ratchet or collet C when the drum B' goes forward and the drum B goes backward. The friction-ring j, secured on springs to the drum B' and rotating with it, is seen at j.

In Fig. 17 both sets of rollers, rings, dogs, and ratchets are shown with the rollers close together, as they are in that position when the drums rotate about half-way round. In coasting or to run the vehicle backward, start one lever back just enough to disconnect the dogs that are in the ratchets, and let them remain there, and there will be no clicking in coasting, as there is no friction on the rollers C", and the vehicle can be run backward when thus disconnected.

Fig. 12 is a cross-section view of a piece of metal for the felly F, like a common wagon-wheel tire, but with the whole outer surface bent outward, as shown, and tapering in thickness from the center, and may be very thin at $v'$ and at the edges, though the metal may be all the way of the same thickness and make a very good felly.

Fig. 13 is a view of Fig. 12, bent sharp at the center outward, but may be bent simply nearly a half round, and also bent again twice, once toward each edge at $v'$ and $v''$, to form a double bed for the rubber tire, which, when desired, may be strengthened by a support, $n'$. The double rubber bed may be formed concave or U-shaped, or of any desired form.

Fig. 14 is a cross-section view of the hollow metallic felly F, with one of the edges bent in against the other side to form the lower part of the double rubber tire bed, and brazed at $v'$, and then the other edge bent in against the other side at $v''$, and also brazed near its sharp edge, and so constructed as to leave a concave bed for the rubber tire, or, as shown, with a bed in the center for the heads or nuts on the end of the spokes, though very few of the spokes need extend thus clear through the felly. The improved endless rubber tire G is also shown in cross-section, with a projection on the side toward the hub to fill the bed between the heads or nuts on the ends of the spokes, when the rubber bed is constructed as shown in the drawings.

Fig. 15 is a view of the improved hub made with flanges or annulars, and with shoulders for the drums B, and with openings in the annulars to admit and hold in place the spokes S, when the other ends are secured in the felly.

Fig. 16 is a cross-section view of the metal felly F', made solid out of one piece of metal and with the rubber tire, as shown.

The construction of many parts of my invention may be varied without changing the devices claimed.

Having thus described my invention, what I claim as new, and desire to secure by Letters Patent, is—

1. In a vehicle, two perches or backbones, M' and M", M' being secured by inclined hinge $i$ to a plate bolted to the neck of M', and each with a following wheel pivotally connected to the backbone to trail as a caster parallel to the other wheels, all so constructed that the backbone M" may be easily removed with its following wheel, or may be adjusted from the ground to a place of rest while the vehicle is in motion, thus changing it to a one-track bicycle, or swung down to the ground, changing the bicycle to a tricycle, substantially as set forth.

2. In a vehicle, a pair of removable and adjustable perches or backbones, M" and M"', each with a following wheel constructed to run at an acute angle from the backbone and parallel with the other wheels, arranged to be adjusted a little above the ground or up to a place of rest by the rider while the vehicle is in motion, thus changing it to a bicycle, or swung down upon the ground, changing the bicycle to a quadricycle, constructed substantially as set forth.

3. In a vehicle, a pair of removable and adjustable perches or backbones, each with a following wheel pivotally attached to the backbone, so that it can turn only part way around to trail as a caster in line with the other wheels, adapting them to be suspended in front of a front driving-wheel a little way above the ground or swung up to a place of rest by the rider while the vehicle is in motion, thus changing it to a bicycle, or swung down upon the ground, changing it to a quadricycle, constructed substantially as set forth.

4. The inclined pivotal bearing $i$, in combination with an adjustable backbone or auxiliary perch of a vehicle and adjustable stays L', the degree of inclination determining the elevation of the adjustable perch and following wheel and the width of the tracks, substantially as set forth.

5. The combination of the two slides $r'$ with connection to the double propelling-drums on each side of the bicycle by means of adjustment with spiral spring by stays and connection to an eccentric, substantially as described, to increase the power or speed.

6. A bicycle propelled by levers extending in opposite directions from the point of bearing, and with seats for two riders, one seat being directly over the driving-wheel, and so constructed that the vehicle may be propelled by one or both riders.

7. A bicycle propelled by levers with flexible connection to a set of double propelling-drums on each side of the driving-wheel, and with a seat for a rider back of the fork, and directly over the rear part of the driving-wheel.

8. A vehicle for only one rider, propelled without the crank-motion by a single pair of levers, each having on either side of the fulcrum flexible connection to a set of double propelling-drums.

9. A bicycle for only one rider, propelled without the crank-motion by a single pair of levers extending beyond the periphery of the driving-wheel, and with a seat lower than the top of the larger wheel, yet having an open space between the seat and handle-bar, extending down lower than the center of the driving-wheel, to permit one limb of a rider to pass easily between the seat and handle-bar.

10. A single-track bicycle propelled without the crank-motion by a single pair of levers extending beyond the periphery of the driving-wheel, having a seat for only one rider, the seat being adjustable, so that it can be moved up or down and secured at the right height above the treadles to suit a rider of any stature.

11. A single-track bicycle propelled without the crank-motion by a single set of levers extending beyond the periphery of the driving-wheel, having a seat for only one rider, in combination with an adjustable handle-bar and connection to the steering-wheel, the handle-bar being arranged to be moved up or down, and secured at the right height to suit a rider of any stature.

12. A single-track bicycle propelled without the crank-motion by a single set of levers, and a seat for one rider, so constructed that another set of levers can be attached, with a seat for another rider, without any other additional driving mechanism, and also so constructed that either rider can propel the vehicle when desired, or both assist in propelling the bicycle.

13. In a safety-bicycle with a seat for a rider near the ground, the addition of the youth's seat J''', secured by bolts to the frame J, the seat being formed of three pieces of metal, the frame of the arms and back made of bent wire, the adjustable foot-rest, and the bolt securing the foot-rest to the frame of the seat.

14. A cog-connection through the hub of a driving-wheel of a vehicle, by which the depression of a lever on one side of the driving-wheel raises at the same time the lever on the other side of the driving-wheel.

15. The divided connection-shaft W, in combination with beveled cog-wheels connecting a lever on one side of a seat with a lever on the other side of the seat, so that the depression of one lever on one side of the seat raises the lever on the other side of the seat.

16. A double drum propelling mechanism, in combination with a shaft or axle connection through the hub of the driving-wheel of a vehicle, connecting a propelling-drum on one side of the driving-wheel with a propelling-drum on the other side of the driving-wheel, and with connection to levers, causing the depression of a lever on one side of the driving-wheel to simultaneously raise the lever on the other side of the driving-wheel.

17. The silent ratchet-collar $c$, in combination with dogs $c'$ and connection to rollers $c''$, operated by the revolving pulleys or drums B and B', rotating or moving in opposite directions.

18. A silent ratchet mechanism operated by frictional connection between an axle with propelling-drum B', rotating or moving around and back, and propelling-drum B, rotating or moving back and around, but always in the opposite direction to the motion of the axle and drum B'.

19. A double drum propelling mechanism, in combination with a pawl-ball silent clutch, with a yielding substance to render the action of the pawls noiseless, the movement of one drum forward bringing the other drum back again into position to act upon the silent clutch, and thus propel the vehicle.

20. A tubular hub with recesses in the annulars for the dust-proof projections from the propelling-drums, a flange on the inside of the annulars for the spokes, and inclined surface in each end for the inclined spool-bearings.

21. The inclined anti-friction adjustable spool-bearings S' and S'' between the inclined surface in the end of the hub and the inclined collar S'''.

22. Inclined anti-friction adjustable double-flanged spool-bearings moving in a circle between inclined surfaces on the inside of the circle and inclined surfaces on the outside of the circle.

23. A hollow felly which is made of one piece of metal by bending the sides outwardly, forming a convex surface toward the hub, and a concave surface of two thicknesses of metal for the bed of a rubber tire, formed by bending one side inward over against the other side and brazing, then bending the other side over and brazing it, substantially as described.

HOMER A. KING.

Witnesses:
B. LEWIS BLACKFORD,
F. W. BROOKS.